United States Patent [19]
Kollmeier et al.

[11] Patent Number: 5,130,344
[45] Date of Patent: Jul. 14, 1992

[54] USE OF POLYSILOXANE POLYOXYALKYLENE BLOCK COPOLYMERS FOR THE PREPARATION OF RIGID POLYURETHANE FOAMS

[75] Inventors: Hans-Joachim Kollmeier, Essen; Rolf-Dieter Langenhagen, Hattingen-Niederwenigern; Helmut Schator; Christian Weitemeyer, both of Essen, all of Fed. Rep. of Germany

[73] Assignee: Th. Goldschmidt AG, Essen, Fed. Rep. of Germany

[21] Appl. No.: 575,349

[22] Filed: Aug. 30, 1990

[30] Foreign Application Priority Data

Aug. 31, 1989 [DE] Fed. Rep. of Germany ....... 3928867

[51] Int. Cl.$^5$ ................. C08J 9/04; C08L 75/04; C08G 18/61
[52] U.S. Cl. .................... 521/111; 521/112; 521/137; 521/159; 521/174; 521/175
[58] Field of Search ........... 521/111, 112, 155, 137, 521/159, 164, 167, 174, 175

[56] References Cited

U.S. PATENT DOCUMENTS

| | | | |
|---|---|---|---|
| 3,505,377 | 4/1970 | Morehouse | 528/15 |
| 3,714,080 | 1/1973 | Dahm et al. | 521/111 |
| 4,247,655 | 1/1981 | Dunleavy et al. | 521/164 |
| 4,269,992 | 5/1981 | Litteral et al. | 521/112 |
| 4,331,555 | 5/1982 | Baskent et al. | 521/111 |
| 4,478,957 | 10/1984 | Klietsch et al. | 521/112 |
| 4,529,743 | 7/1985 | Kollmeier et al. | 521/112 |

Primary Examiner—John Kight, III
Assistant Examiner—John M. Cooney, Jr.
Attorney, Agent, or Firm—Akoo-Toren

[57] ABSTRACT

A process of preparing rigid polyurethane foams is disclosed, wherein polysiloxane polyoxyalkylene block copolymers which have at least one aminofunctional group of the general formula,

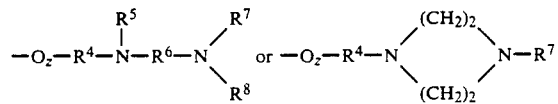

which is linked to a silicon atom, are used in an amount of 0.2 to 5% by weight, based on the polyol or the prepolymer having isocyanate groups, to provide polyurethane foams, which otherwise contain closed cells, with at least partially open the cells.

21 Claims, No Drawings

USE OF POLYSILOXANE POLYOXYALKYLENE BLOCK COPOLYMERS FOR THE PREPARATION OF RIGID POLYURETHANE FOAMS

BACKGROUND OF INVENTION

This invention relates to the preparation of rigid polyurethane foam and more particularly to the preparation of rigid polyurethane foam in the presence of aminofunctional polysiloxane polyoxyalkylene block copolymers to obtain rigid foam with at least partially open cells.

According to the state of the art, rigid polyurethane foams are prepared from polyols with at least three hydroxyl groups per molecule, at least difunctional polyisocyanates, catalysts, blowing agents and polysiloxane polyoxyalkylene block copolymers as foam stabilizers, as well as, if necessary, conventional additives.

A comprehensive account of the raw materials and the methods, which can be used, is to be found in Ullmann "Enzyklopaedie der technischen Chemie" (Encyclopedia of Industrial Chemistry), 1980, volume 19, pages 301 to 341 and in the Kunststoff-Handbuch (Plastics Handbook), volume VII, Polyurethanes, by R. Vieweg and A. Hoechtlen, published by Carl Hanser, Munich, 1966, pages 504 to 544.

In general, polyetherols or polyesterols with at least three hydroxyl groups per molecule are used, the OH number of the polyols generally lying between 300 and 800.

As blowing agent, preferably trichlorofluoromethane or a mixture of trichlorofluoromethane and difluorodichloromethane is used, in general in combination with water. The water reacts with the isocyanate, carbon dioxide and polyurea being split off. The resulting molded articles are almost always closed cell. The density of the rigid foam is between about 23 and 1,000 (g/L or kg/m$^3$).

If a rigid foam is prepared with a density of less than 23 (g/L), there is generally shrinkage, that is, the framework of the closed cells can no longer withstand the external air pressure. This shrinkage is supported by the diffusion of the carbon dioxide through the intact cell membranes in the direction of the surface of the foamed object.

If dimensionally stable, very light, rigid polyurethane foams are to be prepared, excessive amounts of water, for which no corresponding amount of isocyanate is available, are used pursuant to the state of the art. On reaching the boiling range, the excess water evaporates and tears the cell membranes, unless the latter are excessively stabilized.

The so-called I-K foams are a different type of rigid polyurethane foams. The necessary polyol with the catalysts, the stabilizers and the physical blowing agent and an appreciable excess of isocyanate is added here to a spray can and the mixture is allowed to react in the spray can. A prepolymer containing isocyanate groups is formed. If the spray valve is activated, the blowing agent forces the prepolymer out of the can and there is spontaneous foaming. A very soft foam is formed at first. The isocyanate groups still present react with the moisture of the air, forming a largely closed cell, rigid foam. These types of foam are used, for example, for fastening door frames and window frames. The cavity between the wall and the object that is to be built in is thus formed. Because of fluctuations in air pressure, the closed cell foam expands or contracts; this has a disadvantageous effect on door and window frames, that is, the accuracy of fit of the doors and windows varies.

It has been ascertained that the quality and properties of the rigid foams formed depend in a large measure on the structure and chemical composition of the foam stabilizers used. For this reason, polysiloxane polyoxyalkylene block copolymers of different structure and different composition have already been described as foam stabilizers.

As polysiloxane polyoxyalkylene block copolymers for the aforementioned purpose, the German Auslegeschrift 17 19 238, for example, discloses siloxane oxyalkylene copolymers of the general formula

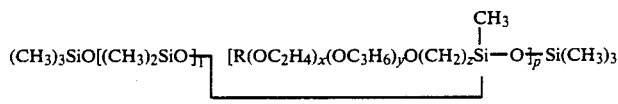

(1=3 to 25; x=1 to 25; y=0 to 15; z=2 or 3; p=1 to 10; R=hydrogen or methyl), which are hydrolytically stable, with the proviso that at least 25% by weight of the oxyalkylene groups are oxyethylene groups and, in the event that R=H, the hydroxyl groups constitute at least 1.5% by weight of the copolymer.

For the preparation of polyurethane foams, the German Patent 20 29 293 discloses the use of siloxane-modified carbamic acid derivatives as foam stabilizers, which consist of at least one structural unit of the general formula

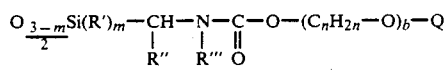

and further structural units of the general formula

which are linked through Si—O—Si bonds with the first-mentioned structural unit, at least one structural unit per thousand corresponding to the first-mentioned formula, wherein
- R' represents an optionally halogenated or cyano-substituted $C_1$–$C_{10}$ alkyl, $C_4$–$C_{10}$ cycloalkyl or $C_6$–$C_{10}$ aryl group,
- R" represents a hydrogen atom or a methyl or phenyl group,
- R'" represents a $C_1$–$C_{10}$ alkyl, $C_4$–$C_{10}$ cycloalkyl, $C_2$–$C_{10}$ alkenyl, $C_7$–$C_{10}$ aralkyl, di($C$–$C_{10}$ alkyl)amino-$C_1$–$C_{10}$-alkyl, $C_6$–$C_{10}$ aryl, or $C_7$–$C_{10}$ alkaryl group,
- Q represents a saturated $C_1$–$C_6$ alkyl group or a $C_6$ aryl group,
- m is 1 or 2
- n is 2, 3 or 4 and
- b is a whole number from 1 to 200 the groups and numerical values at each site of a molecule being independent of one another.

Further, particularly suitable polysiloxane polyoxyalkylene block copolymers are disclosed in the German Patent 16 94 366. The patent claims a method for the preparation of polyurethane foams which is characterized that polyoxyalkylene polysiloxane block copolymers are used, the polysiloxane block of which, however, is built up in a known manner and the polyoxyalkylene block of which consists of 25 to 70% by weight of a polyoxyalkylene with an average molecular weight of 1,600 to 4,000 and an ethylene oxide content of 20 to 100% by weight, the remainder being propylene oxide and optionally higher alkylene oxides, and 30 to 75% by weight of a polyoxyalkylene with an average molecular weight of 400 to 1,200 and an ethylene oxide content of 65 to 100% by weight, the remainder being propylene oxide and optionally higher alkylene oxides. The essence of this patent thus is that polyoxyalkylene blocks of defined, different construction and, with that, of different hydrophilicity, are contained in the block copolymer.

OBJECTS OF THE INVENTION

It is an object of the invention to provide foam stabilizers, which ensure a stabilization of the cells of rigid polyurethane foams ranging in density from 15 to 100 (g/L) and, at the end of the rising process, bring about at least partial opening of the cells.

Another object of the invention is to assure the formation of dimensionally stable foams by means of cell openings.

A further object of the invention is to provide a method of preparing rigid polyurethane foam wherein at least part of cells normally closed are open and the dimensional stability of the foam is assured. It suffices if an appreciable portion of the cells is opened; it is not necessary that 100% of the cells be opened.

These and other objects of the invention are accomplished by the invention disclosed below.

SUMMARY OF THE INVENTION

It has been discovered, according to the invention, that at least partial opening of the cells of rigid polyurethane foam, which otherwise contains closed cells, is achieved by using for the preparation of the rigid polyurethane foam polysiloxane polyoxyalkylene block copolymers which have at least one aminofunctional group of the general formula

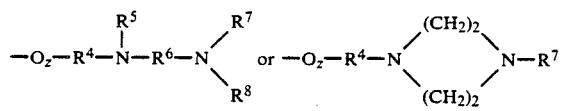

which is linked to a silicon atom and wherein
R$^4$ is a divalent group,
R$^5$ is a hydrogen group or an alkyl group with 1 to 4 carbon atoms, a polyether group of the formula —(C$_q$H$_{2q}$O)$_r$R$^9$ (q=2, 3 or 4, r=1 to 100, R$^9$=a hydrogen group or an alkyl group with 1 to 4 carbon atoms) or the group

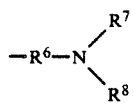

wherein
R$^6$ is a divalent aliphatic hydrocarbon group with 2 to 6 carbon atoms or a divalent aromatic hydrocarbon group,
R$^7$ and R$^8$ are each an alkyl group with 1 to 4 carbon atoms, which may have an OH group or be a common constituent of a 5- or 6-membered ring, which may contain an oxygen or nitrogen atom,
z=0 or 1.

DESCRIPTION OF THE INVENTION

The polysiloxane polyoxyalkylene block copolymer, according to the invention is used in an amount of about 0.2 to 5% by weight, based on the weight if the polyol or prepolymer having isocyanate groups. Also, the aminofunctional group of the polysiloxane polyoxyalkylene block copolymer can be linked to the polysiloxane backbone over an SiOC or an SiC bond, depending on whether the subscript z has a value of 0 or 1.

R$^4$ is a divalent group, particularly a divalent aliphatic hydrocarbon group with 2 to 6 carbon atoms. Preferably, the R$^4$ group is the

—(CH$_2$)$_3$—O—CH$_2$—CHOH—CH$_2$— group, with the proviso that the subscript z is equal to 0 in the aminofunctional group.

R$^5$ is a hydrogen group or an alkyl group with 1 to 4 carbon atoms. As alkyl group, the methyl group is preferred.

R$^5$ can also represent a polyether group of the formula —(C$_q$H$_{2q}$O)$_r$R$^9$. In this formula, q has an absolute value of 2, 3 or 4. The average value in the polymeric molecule may be a fractional number from 2 to 4. r has a value from 1 to 100. R$^9$ is a hydrogen group or an alkyl group with 1 to 4 carbon atoms, the methyl group once again being preferred as alkyl group. The composition of the polyether group preferably corresponds to that of the polyoxyalkylene block or blocks of the polysiloxane polyoxyalkylene block copolymer, to the siloxane block of which the amino-functional group is linked.

Finally, R$^5$ can also be a group of the formula

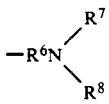

R$^6$ is a divalent, aliphatic hydrocarbon group with 2 to 6 carbon atoms, preferably a divalent aliphatic hydrocarbon group with 2 to 4 carbon atoms or a divalent aromatic hydrocarbon group, preferably the phenylene group.

R$^7$ and R$^8$ are the same or different and represent alkyl groups with 1 to 4 carbon atoms, preferably methyl groups. The alkyl groups can have hydroxyl groups. R$^7$ and R$^8$ can additionally be a common constituent of a 5- or 6-membered ring, which can have an oxygen or a nitrogen atom, such as

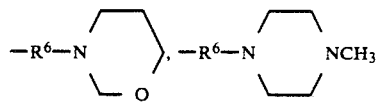

The aminofunctional groups of the polysiloxane polyoxyalkylene block copolymers, which are to be used pursuant to the invention, thus have at least one tertiary and one secondary nitrogen atom or two tertiary nitrogen atoms. This is evidently the structural prerequisite for the ability to open at least partially the cells of rigid polyurethane foams, which otherwise would be closed.

The aminofunctional groups can be a component of a linear or a branched polysiloxane polyoxyalkylene block copolymer. If the block copolymer is one with a linear siloxane chain, the aminofunctional groups can be lateral and/or terminal.

A preferred embodiment of the object of the present invention therefore is the use of polysiloxane polyoxyalkylene block copolymers with the general, average formula

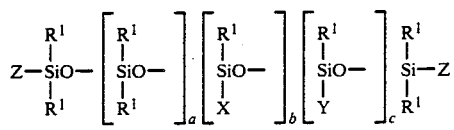
    I wherein
  $R^1$ is an alkyl group with 1 to 6 carbon atoms, but at least 90% of the $R^1$ groups are methyl groups,
  X is a polyoxyalkylene block of the general formula

in which $R^2$ is a divalent alkylene group with 3 to 11 carbon atoms,
  $R^3$ is a hydrogen group or an alkyl group with 1 to 4 carbon atoms,
  p has a value of 0 or 1,
  m represents the number 2, 3 or 4, the average value of which is 2.0 to 2.7,
  n has a value of 1 to 100,
  Y is an aminofunctional group of the formula

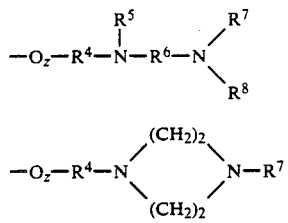

in which $R^4$, $R^5$, $R^6$, $R^7$, $R^8$ and z have the meaning already given,
  Z represents X, Y or $R^1$,
  a has a value of 10 to 150,
  b has a value of 1 to 20,
  c has a value of 1 to 20.

In formula, I, $R^1$ is an alkyl group with 1 to 6 carbon atoms. At least 90% of the $R^1$ groups are methyl groups. Preferably however, all the $R^1$ are methyl groups.

X is a polyoxyalkylene block of the general formula

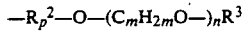

In this formula of the polyoxyalkylene block, $R^2$ is a divalent alkylene group with 3 to 11 carbon atoms, particularly the —(CH$_2$)$_3$— or —(CH$_2$)$_{11}$— group. The —(CH$_2$)$_3$— group is especially preferred.

$R^3$ is a hydrogen group of an alkyl group with 1 to 4 carbon atoms, particularly a methyl group. p has a value of 0 or 1 and m an absolute value of 2.3 or 4. However the average value of m in the polymeric molecule is 2.0 to 2.7.

n has a value of 1 to 100.

Y once again is an aminofunctional group of the already described formulas

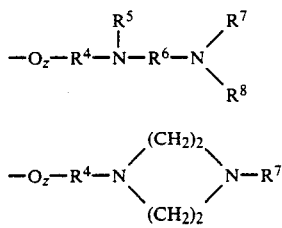

In these formulas, the $R^4$, $R^5$, $R^6$, $R^7$, $R^8$ groups and the subscript z have the meaning already given.
  Z represents X, Y or $R^1$.
  a has a value of 10 to 150 and preferably of 15 to 90.
  b has a value of 1 to 20 and preferably of 1 to 10.
  c has a value of 1 to 20 and preferably of 1 to 10.
  The ratio of the subscripts b:c preferably is 0.9:0.1 to 0.2:0.8.

The aminofunctional groups can also be a constituent of a branched polysiloxane polyoxyalkylene block copolymer.

A further preferred embodiment of the object of the present invention therefore consists of the use of polysiloxane polyoxyalkylene block copolymers with the general average formula

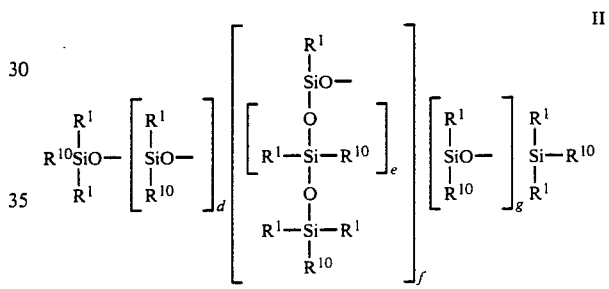
    II

In this formula II, $R^1$ has the meaning already given. $R^{10}$ is selected from the group comprising $R^1$, X and Y, which have already been described in detail above. However the condition, that there is at least one X group and at least one Y group in the average molecule, must be fulfilled.
  d has a value of 0 to 20 and preferably a value of 1 to 10.
  e has a value of 0 to 20 and preferably a value of 1 to 10.
  f has a value of 1 to 10 and preferably a value of 1 to 6.
  g has a value of 0 to 20 and preferably a value of 1 to 10.

Independently of the structure of the framework of the polysiloxane polyoxyalkylene block copolymer, aminofunctional groups are preferred, in which $R^5$ is a hydrogen group or a methyl group, $R^6$ is a —(CH$_2$)$_3$— group and $R^7$ and $R^8$ in each case represent a methyl group.

The compounds, which are to be used pursuant to the invention, are preferably added to the polyol component or to the prepolymer that has the isocyanate groups in an amount of 0.2 to 5% by weight and preferably in an amount of 0.5 to 2% by weight.

The compounds, which are to be used pursuant to the invention, can be prepared by methods known in the art. In a preferred method, an organopolysiloxane, which has SiH groups, is reacted with a mixture of an allyl polyether and an allyl glycidyl ether in the presence of a hydrosilylation catalyst. After removal of excess allyl glycidyl ether, the product is reacted with N,N-dialkylaminoalkylamine.

In a different method, a polyoxyalkylene ether monool is first mixed with N,N-dialkylaminoalkylmethylaminoalkanol and the mixture is reacted with a chloropolysiloxanyl sulfate, as disclosed in U.S. Pat. No. 3,115,512.

In the method named first, modified organopolysiloxanes are obtained, to which polyether blocks and amines are linked over SiC bonds. In the second case, similar compounds with SiOC bonds are formed. Those skilled in the art can infer further details of this method from Examples 1 to 10.

Examples of compounds, which are to be used pursuant to the invention are:

$$CH_2=CH-CH_2-(OC_2H_4)_{14}(OC_3H_6)_7OH$$

14.3 g (0.125 moles) of allyl glycidyl ether and 4 mg of cis-[PtCl$_2$(NH$_3$)$_2$] are added. Nitrogen is passed through the apparatus. At a temperature of 110° to 115° C., 74.6 g (0.2 moles SiH) of a siloxane of the average formula

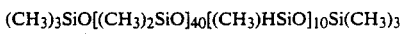

$$(CH_3)_3SiO[(CH_3)_2SiO]_{40}[(CH_3)HSiO]_{10}Si(CH_3)_3$$

are added dropwise over a period of 25 minutes. Subsequently, the reaction is continued for 2 hours. After that, the excess allyl glycidyl ether is distilled off under vacuum (20 mbar). For this, the temperature of the contents of the flask is increased to 140° C. At the end, the product is mixed at 80° C. with 2 g of bentonite,

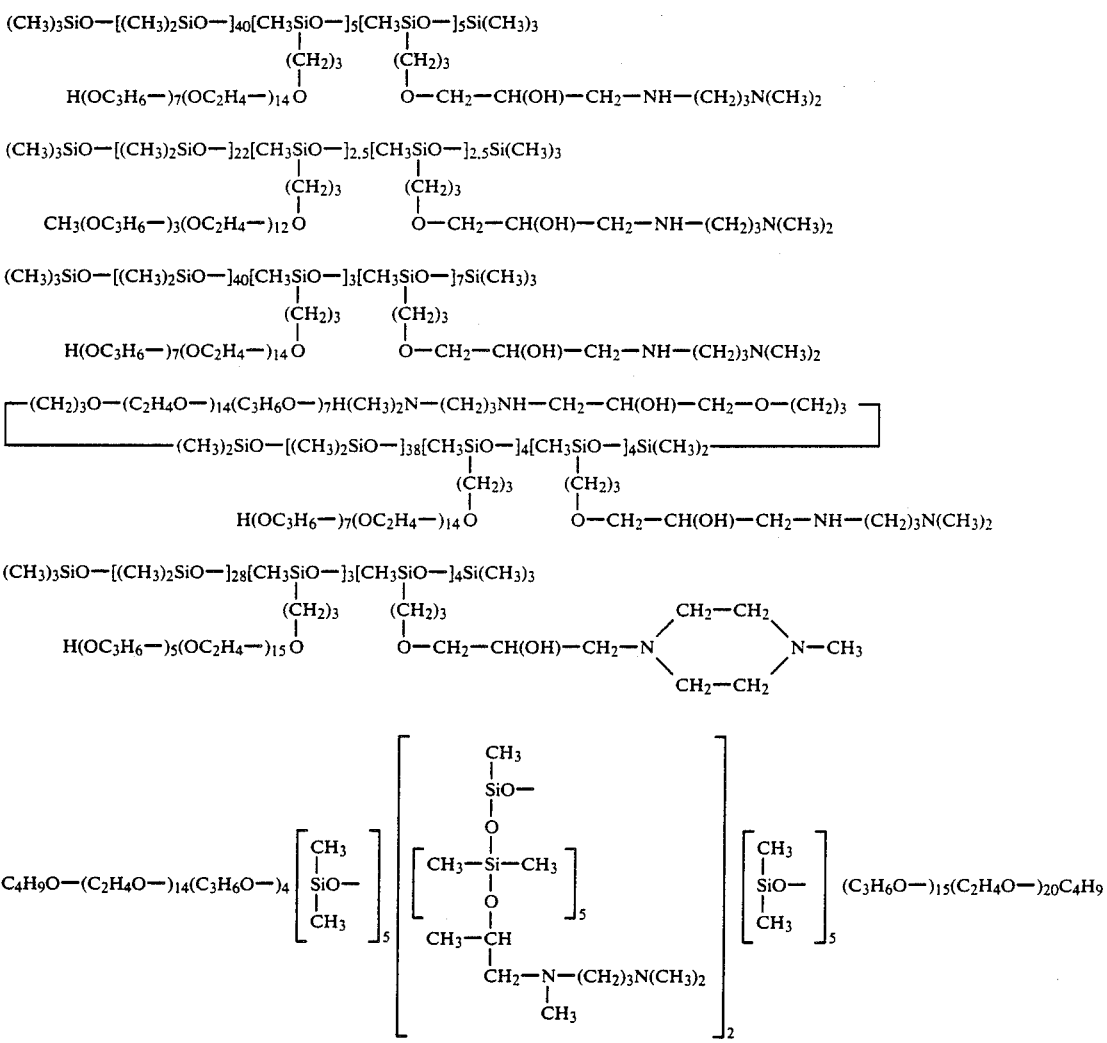

In the following Examples, the preparation of the inventive compounds is described first. In further examples, the opening of the cells, brought about by the use of these compounds, is proven.

EXAMPLE 1

To a flask, equipped with dropping funnel, stirrer, thermometer, gas inlet and reflux condenser, 135 g (0.125 moles) of a polyether having the average formula stirred for 30 minutes and filtered. A clear product, colored yellowish, is obtained. The SiH conversion is 99.2% (determined by the hydrogen, which can be split off with n-butanol in an alkaline medium). The content of epoxy oxygen is 0.76% (theoretical content=0.72).

To a flask equipped with stirrer, thermometer and reflux condenser, 190 g (=0.09 moles of epoxy groups) of the polyethersiloxane, which is obtained and contains epoxy groups, and 13.8 g (=0.135 moles) of N,N-dimethylaminopropylamine are added, heated to 80° C. and stirred for 5 hours. After that, the excess amine is distilled off at 140° C. and 20 mbar. A clear, yellow-brown product, with a nitrogen content of 1.2% (theoretical content: 1.27%) and a viscosity at 25° C. of 1106 mPas, remains behind.

EXAMPLE 2

To a flask equipped with dropping funnel, stirrer, thermometer, gas inlet and reflux condenser, 189 g (=0.175 moles) of a polyether of average formula $$CH_2=CH-CH_2-(OC_2H_4)_{14}(OC_3H_6)_7OH$$

8.6 g (=0.075 moles) of allyl glycidyl ether and 4 mg of cis-[PtCl$_2$(NH$_3$)$_2$] are added. Nitrogen is passed through the apparatus. At a temperature of 110° to 115° C., 74.6 g (=0.2 moles SiH) of a siloxane of average formula $$(CH_3)_3SiO[(CH_3)_2SiO]_{40}[(CH_3)HSiO]_{10}Si(CH_3)_3$$

are added dropwise within 20 minutes. The reaction is subsequently allowed to continue for 2 hours. After that, the excess allyl glycidyl ether is distilled off at 20 mbar. In so doing, the temperature of the contents of the flask is increased to 140° C. A small sample is taken from the batch for analysis. The conversion of SiH is 98.5% and the epoxy oxygen content is 0.33% (theoretical content: 0.35%). The batch is treated at room temperature with 12.3 g (=0.12 moles) of N,N-dimethylaminopropylamine, heated and stirred for 5 hours at 80° C. After that, the excess amine is distilled off at 140° C. and 20 mbar. A clear, yellow-brown product with a nitrogen content of 0.55% (theoretical content: 0.61%) and a viscosity at 25° C. of 874 mPas is obtained.

EXAMPLE 3

Under the conditions of Example 1, 153.2 g (=0.125 moles) of a polyether of the average formula $$CH_2=CH-CH_2-(OC_2H_4)_{17}(OC_3H_6)_7OCH_3$$

and 14.3 g (=0.125 moles) of allyl glycidyl ether are reacted with 74.6 g (=0.2 moles SiH) of a siloxane of the average formula $$(CH_3)_3SiO[(CH_3)_2SiO]_{40}[(CH_3)HSiO]_{10}Si(CH_3)_3$$

in the presence of 8 mg of cis-[PtCl$_2$(NH$_3$)$_2$] and worked up. The intermediate is clear and yellow-brown. The SiH conversion is 97.4% and the epoxy oxygen content is 0.07% (theoretical content: 0.67%).

As in Example 1, 183 g (=0.08 moles epoxy groups) of the intermediate, which contains epoxy groups, is reacted with 16.4 g (=0.16 moles) of N,N-dimethylaminopropylamine. A clear, yellow-brown product, with a nitrogen content of 1.03% (theoretical content: 1.17%) and a viscosity at 25° C. of 614 mPas, is obtained.

EXAMPLE 4

Under the conditions of Example 1, 135 g (=0.125 moles) of a polyether of the average formula $$CH_2=CH-CH_2-(OC_2H_4)_{14}(OC_3H_6)_7OH$$

and 14.3 g (=0.125 moles) of allyl glycidyl ether are reacted with 68.7 g (=0.2 moles SiH) of a siloxane of average formula $$H(CH_3)_2SiO[(CH_3)_2SiO]_{38}[(CH_3)HSiO]_8Si(CH_3)_2H$$

in the presence of 3 mg of cis-[PtCl$_2$(NH$_3$)$_2$] and worked up. The intermediate is clear and yellow. The SiH conversion is 99% and the epoxy oxygen content is 0.07% (theoretical content: 0.74%).

As in Example 1, 171 g (=0.075 moles of epoxy groups) of the intermediate, which contains epoxy groups, is reacted with 15.3 g (=0.15 moles) of N,N-dimethylaminopropylamine. A clear, yellow-brown product is obtained with a nitrogen content of 1.05% (theoretical content: 1.17%) and a viscosity at 25° C. of 980 mPas.

EXAMPLE 5

Under the conditions of Example 2, 95 g (0.125 moles) of a polyether of the average formula $$CH_2=CH-CH_2-(OC_2H_4)_{12}(OC_3H_6)_3OH$$

and 14.3 g (=0.125 moles) of allyl glycidyl ether are reacted with 83.8 g (=0.2 moles) of a siloxane of average formula $$(CH_3)_3SiO[(CH_3)_2SiO]_{22}[(CH_3)HSiO]_5Si(CH_3)_3$$

in the presence of 3 mg of cis-[PtCl$_2$(NH$_3$)$_2$]. Analysis reveals an SiH conversion of 98.3% and an epoxy oxygen content of 0.82% (theoretical content: 0.84%).

The intermediate, without being worked up, is reacted as in Example 2 with 20.4 g (=0.2 moles) of N,N-dimethylaminopropylamine. A clear yellow-brown product with a nitrogen content of 1.32% (theoretical content: 1.40%) and a viscosity at 25° C. of 750 mPas is obtained.

EXAMPLE 6

Under the conditions of Example 1, 108.4 g (=0.108 moles) of a polyether of average formula $$CH_2=CH-CH_2-(OC_2H_4)_{15}(OC_3H_6)_5OH$$

and 16.3 g (=0.143 moles) of allyl glycidyl ether are reacted with 76 g (=0.2 moles SiH) of a siloxane of the average formula $$(CH_3)_3SiO[(CH_3)_2SiO]_{28}[(CH_3)HSiO]_7Si(CH_3)_3$$

in the presence of 5 mg of cis-[PtCl$_2$(NH$_3$)$_2$] and worked up. The intermediate is clear and yellow-brown. The product contains 0.87% epoxy oxygen (theoretical content: 0.92%) and the SiH conversion is 98.3%.

As in Example 1, 147 g (=0.08 moles epoxy groups) of the intermediate, which contains epoxy groups, is reacted with 20 g (=0.2 moles) of N-methylpiperazine. A clear, yellow-brown product is obtained, which has a nitrogen content of 1.5% (theoretical content: 1.44%) and a viscosity at 25° C. of 547 mPas.

EXAMPLE 7

To a flask, equipped with stirrer, thermometer, gas inlet and distillation head, 101.4 g (=0.11 moles) of a polyether of average formula $C_4H_9—(OC_2H_4)_{14}(OC_3H_6)_4OH$ 200.6 g (=0.11 moles) of a polyether of average formula $C_4H_9—(OC_2H_4)_{20}(OC_3H_6)_{15}OH$ and 850 mL of toluene are added. Under a blanket of nitrogen 150 mL of toluene are distilled off in order to dry the polyether mixture azeotropically. At 50° C., the distillation head is exchanged for a reflux condenser. Subsequently, 38.4 g (=0.22 moles) of the compound $$HOCH(CH_3)—CH_2—N(CH_3)—(CH_2)_3N(CH_3)_2$$

are added to the flask first and mixed in well and then 174 g (=0.1 moles) of a siloxane of average formula

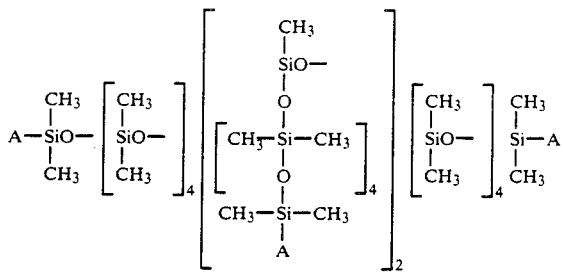

in which 75% of terminal group a consists of Cl and 25% of SO$_{4/2}$. After the siloxane has been mixed in well (10 minutes), ammonia gas is passed in at 50° C. until the contents of the flask react ammoniacally. The reaction is allowed to proceed for a further hour with continued introduction of ammonia gas. The precipitated salt is subsequently filtered off. After that, toluene is distilled off at 70° C. and 20 mbar. A light-brown, almost clear product is obtained. Its viscosity at 25° C. is 1015 mPas and the nitrogen content is 1.15% (theoretical content: 1.23%).

EXAMPLE 8

Under the conditions of Example 1, 405 g (=0.375 moles) of a polyether of average formula $CH_2=CH—CH_2—(OC_2H_4)_{14}(OC_3H_6)_7OH$ and 42.8 g (=0.375 moles) of allyl glycidyl ether are reacted with 223.8 g (=0.6 moles SiH) of a siloxane of the average formula $(CH_3)_3SiO[(CH_3)_2SiO]_{40}[(CH_3)HSiO]_{10}Si(CH_3)_3$ in the presence of 15 mg of cis-[PtCl$_2$(NH$_3$)$_2$] and worked up. The intermediate is clear and yellow brown. The SiH conversion is 99.4% and the epoxy oxygen content 0.69% (theoretical content: 0.72%).

As in Example 1, 185 g (=0.08 moles epoxy groups) of the intermediate, which contains epoxy groups, are reacted with 28.8 g (=0.02 moles) of 3-morpholinopropylamine. A clear, yellow-brown product with a nitrogen content of 1.08% (theoretical content: 1.14%) and a viscosity at 25° C. of 1050 mPas is obtained.

EXAMPLE 9

As in Example 1, 185 g (=0.08 moles epoxy groups) of the intermediate, obtained in Example 8 and containing epoxy groups, is reacted with 26.0 g (=0.2 moles) of 2-piperazinoethanol. After the reaction, the excess amine is distilled off at 120° C. and 1 mbar. A clear, light-yellow product, which contains 1.24% nitrogen (theoretical content: 1.15%) and has a viscosity of 980 mPas at 25° C., is obtained.

EXAMPLE 10

As in Example 1, 185 g (=0.08 moles epoxy groups) of the intermediate, which is obtained in Example 8 and contains epoxy groups, is reacted with 27.2 g (=0.2 moles) of N,N-dimethyl-1,4-phenylenediamine. After the reaction, the excess amine is distilled off at 120° C. and 1 mbar. A clear, light-brown product, which contains 1.20% nitrogen (theoretical content: 1.14%) and has a viscosity of 1,278 mPas at 25° C., is obtained.

EXAMPLE 11 (not of the invention)

The siloxane, used in Example 1, is reacted only with the polyether used in Example 1.

To an apparatus, as described in Example 1, 135 g (=0.125 moles) of a polyether of average formula $CH_2=CH—CH_2—(OC_2H_4)_{14}(OC_3H_6)_7OH$ and 37.3 g (=0.1 moles SiH) of a siloxane of average formula $(CH_3)_3SiO[(CH_3)_2SiO]_{40}[(CH_3)HSiO]_{10}Si(CH_3)_3$ are reacted in the presence of 4 mg of cis-[PtCl$_2$(NH$_3$)$_2$]. For this, the polyether and the platinum compound are added under a blanket of nitrogen at 110° to 115° C. and the siloxane is added dropwise within 20 minutes. The reaction is allowed to continue for a further 3 hours, after which the batch is reacted as in Example 1 with 1.5 g of bentonite and filtered. The SiH conversion is 98.7% and the viscosity at 25° C. is 1105 mPas.

EXAMPLE 12 (not of the invention)

The comparison is carried out similar to Example 1. However, instead of the allyl glycidyl ether, the compound $CH_2=CH—CH_2—O—CH_2CHOH—CH_2—OCH_3$ is used. A copolymer is thus obtained, which does not contain the inventive amino groups, but otherwise has a similar structure.

As described in Example 1, 135 g (=0.125 moles) of a polyether of the average formula $CH_2=CH—CH_2—(OC_2H_4)_{14}(OC_3H_6)_7OH$ and 18.3 g (=0.125 moles) of allyl 2-hydroxy-3-methoxypropyl ether are reacted with 74.6 g (=0.2 moles SiH) of a siloxane of the average formula $(CH_3)_3SiO[(CH_3)_2SiO]_{40}[(CH_3)HSiO]_{10}Si(CH_3)_3$ in the presence of 7 mg of cis-[PtCl$_2$(NH$_3$)$_2$]. After the post-reaction, volatile components are distilled off at 140° C. and 20 mbar. The residue in treated with 2.5 g of bentonite and filtered. The SiH conversion is 96.9% and the viscosity at 25° C. is 1047 mPas.

I. Application Testing of the Stabilization and Cell Opening of Stabilizers, Which are to be Used Pursuant to the Invention in Rigid Polyurethane Foams A rigid polyurethane foam is prepared according to the state of the art, in the following manner:

Formulation A)

100 g rigid foam polyol, for example, with an OH number of 500
1.0 g water
3.0 g triethylamine
1.0 g stabilizer and
40.0 g trichlorofluoromethane
are stirred for 50 sec. at 1,000 rpm for the purpose of homogenization. The air, which is beaten in at the same time, serves as a nucleation aid, in order to arrive at a fine celled foam.

After that, 155 g of a crude diphenylmethane diisocyanate (MDI), corresponding to an index of 110, are added to this mixture. The mixture is then stirred intensively for 7 seconds at 2,500 rpm. The homogenized mixture is then added to a paper-lined mold. The foam that is formed rises in about 2 minutes and consolidates. After 24 hours, the foam is cut open and investigated with the help of the Beckmann "Air Comparison Pycnometer Model 930" for the percentage of open cells.

Formulation B)

100 g rigid foam polyol, for example, with an OH number of 550
4.0 g water
1.5 g dimethylcyclohexylamine
1.0 g stabilizer and
212 g crude MDI with an index of 110
are treated as under A) and foamed. The percentage of open cells is determined as in A).

Foamings with Stabilizers Prepared in Examples 1 to 12

| Stabilizer of Example | Of The Invention | Formulation A) % Open Cells | Formulation B) % Open Cells |
| --- | --- | --- | --- |
| 1 | yes | >95 | >95 |
| 2 | yes | 78 | 87 |
| 3 | yes | >95 | >95 |
| 4 | yes | 93 | >95 |
| 5 | yes | 92 | >95 |
| 6 | yes | 18 | 24 |
| 7 | yes | 15 | 20 |
| 8 | yes | 21 | 26 |
| 9 | yes | 22 | 25 |
| 10 | yes | 18 | 24 |
| 11 | no | <5 | <5 |
| 12 | no | <5 | <5 |

Formulation C)

100 g rigid foam polyol with an OH number of 500,
1.0 g water,
3.0 g triethylamine,
1.0 g stabilizer
20 g trifluoromethane and
155 g crude MDI with an index of 110.
The use of stabilizers of Example 1 leads to more than 95% open cells.

Formulation D)

100 g rigid foam polyol with an OH number of 500,
1.0 g water,
3.0 g triethylamine,
1.0 g stabilizer,
10 g trifluoromethane and
155 g crude MDI with an index of 110
In this formulation, the stabilizer of Example 1 produces 75% open cells.

I. Application Testing of the Dimensional Behavior of Polyurethane Foams, Which were Obtained with Stabilizers of the Invention and not of the Invention For this test, a 10 cm × 10 cm × 10 cm foam cube is stored for 24 hours at −30° C. After thawing, the change in volume (shrinkage) is determined. The density of the foams tested is between 22.5 and 24.2. Formulation A) is used; however, 45 g of trifluoromethane are employed.

| Stabilizer of Example | Of The Invention | Concentration Employed (%) | Dimensional Stability % Shrinkage |
| --- | --- | --- | --- |
| 1 | yes | 0.5 | <1 |
| 1 | yes | 1.0 | <1 |
| 1 | yes | 1.5 | <1 |
| 11 | no | 0.5 | 39 |
| 11 | no | 1.0 | 39 |
| 11 | no | 1.5 | 40 |

We claim:

1. A method of producing rigid polyurethane foam, wherein polyol is reacted with at least difunctional polyisocyanate with the aid of catalyst, blowing agent and foam stabilizer which is a polysiloxane polyoxyalkylene block copolymer, comprising using for the production of the rigid polyurethane a polysiloxane polyoxyalkylene block copolymer which has at least one aminofunctional group of the formula

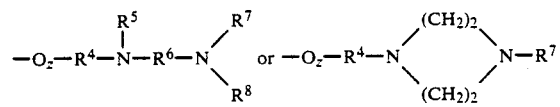

which is linked to a silicon atom and wherein
$R^4$ is a divalent group,
$R^5$ is a hydrogen group or an alkyl group with 1 to 4 carbon atoms, a polyether group of the formula $—(C_qH_{2q}O)_rR^9$, wherein q=2, 3 or 4, r=1 to 100, $R^9$ is a hydrogen group or an alkyl group with 1 to 4 carbon atoms, or the group

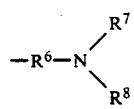

$R^6$ is a divalent aliphatic hydrocarbon group with 2 to 6 carbon atoms or a divalent aromatic hydrocarbon group,
$R^7$ and $R^8$ are each alkyl groups with 1 to 4 carbon atoms, which may have an OH group or be a common constituent of a 5- or 6-membered ring, which may contain an oxygen or nitrogen atom and
Z=0 or 1 whereby the cells of the rigid polyurethane foam, which otherwise are closed, are at least partially opened.

2. The method of producing rigid polyurethane foam according to claim 1 in which the rigid polyurethane foam is produced using 0.2 to 5% by weight of the polysiloxane polyoxyalkylene block copolymer based on the weight of polyol or based on the weight of prepolymer formed during the reaction and containing isocyanate groups.

3. The method of producing rigid polyurethane foam according to claim 2, in which the polysiloxane polyoxyalkylene block copolymer has the average formula

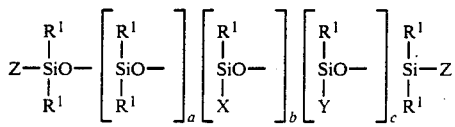

wherein $R^1$ is an alkyl group with 1 to 6 carbon atoms, but at least 90% of the $R^1$ groups are methyl groups, X is a polyoxyalkylene block of the formula

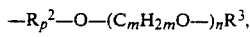

in which $R^2$ is a divalent alkylene group with 3 to 11 carbon atoms, $R^3$ is a hydrogen group or an alkyl group with 1 to 4 carbon atoms, p has a value of 0 or 1, m represents the number 2, 3 or 4, the average value of which is 2.0 to 2.7 and n has a value of 1 to 100, Y is an aminofunctional group of the formula

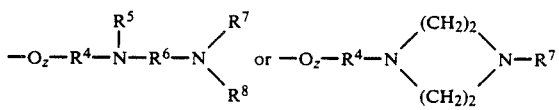

in which $R^4$, $R^5$, $R^6$, $R^7$, $R^8$ and z have the meaning already given, Z represents X, Y or $R^1$, a has a value of 10 to 150, b has a value of 1 to 20 and c has a value of 1 to 20.

4. The method of producing rigid polyurethane foam according to claim 3, in which the ratio of b:c in the polysiloxane polyoxyalkylene block copolymer is 0.9:0.1 to 0.2:0.8.

5. The method of producing rigid polyurethane foam according to claim 2, in which the polysiloxane polyoxyalkylene block copolymer has the average formula

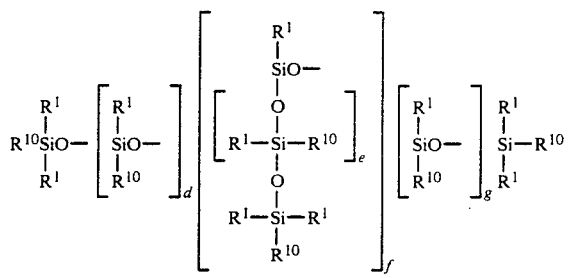

wherein $R^1$ has the meaning already given, $R^{10}$ is selected from the group comprising $R^1$, X and Y, which have the meaning already given, with the proviso that at least one X group and one Y group must be present in the average molecule d has a value of 0 to 20, e has a value of 0 to 20, f has a value of 1 to 10 and g has a value of 0 to 20.

6. The method of producing rigid polyurethane foam according to claim 5, in which d has a value of 1 to 10, e has a value of 1 to 10, f has a value of 1 to 6 and g has a value of 1 to 10.

7. The method of producing rigid polyurethane foam according to claim 3, in which $R^1$ is a methyl group.

8. The method of producing rigid polyurethane foam according to claim 3, wherein z in the aminofunctional group of the polysiloxane polyoxyalkylene block copolymer has value of 0 and $R^4$ is a group having the formula $-(CH_2)_3-O-CH_2-CHOH-CH_2-$.

9. The method of producing rigid polyurethane foam according to claim 3, in which in the polysiloxane polyoxyalkylene block copolymer $R^5$ is a hydrogen atom or a methyl group, $R^6$ is a $-(CH_2)_3-$ group and $R^7$ and $R^8$ are each a methyl group.

10. A method of at least partially opening the cells of rigid polyurethane foam, wherein the polyurethane foam is produced by reacting polyol with at least difunctional polyisocyanate with the aid of catalyst, blowing agent and foam stabilizer which is a polysiloxane polyoxyalkylene block copolymer, comprising producing the rigid polyurethane foam with a polysiloxane polyoxyalkylene block copolymer which has at least one aminofunctional group of the formula

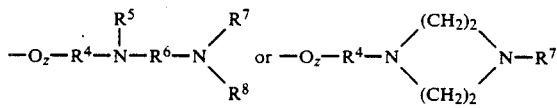

which is linked to a silicon atom and wherein $R^4$ is a divalent group, $R^5$ is a hydrogen group or an alkyl group with 1 to 4 carbon atoms, a polyether group of the formula $-(C_qH_{2q}O)_rR^9$, wherein q=2, 3 or 4, r=1 to 100, $R^9$ is a hydrogen group or an alkyl group with 1 to 4 carbon atoms, or the group

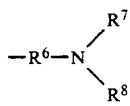

R$^6$ is a divalent aliphatic hydrocarbon group with 2 to 6 carbon atoms or a divalent aromatic hydrocarbon group, R$^7$ and R$^8$ are each an alkyl group with 1 to 4 carbon atoms, which may have an OH group or be a common constituent of a 5- or 6-membered ring, which may contain an oxygen or nitrogen atom and z=0 or 1.

11. The method of at least partially opening the cells of rigid polyurethane foam according to claim 10, in which the rigid polyurethane foam is produced with 0.2 to 5% by weight of the polysiloxane polyoxyalkylene block copolymer based on the weight of polyol or based on the weight of prepolymer formed during the reaction and containing isocyanate groups.

12. The method of at least partially opening the cells of rigid polyurethane foam according to claim 11, in which the polysiloxane polyoxyalkylene block copolymer has the average formula

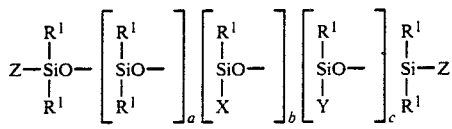

wherein

R$^1$ is an alkyl group with 1 to 6 carbon atoms, but at least 90% of the R$^1$ groups are methyl groups, X is a polyoxyalkylene block of the formula

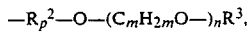

in which

R$^2$ is a divalent alkylene group with 3 to 11 carbon atoms,

R$^3$ is a hydrogen group or an alkyl group with 1 to 4 carbon atoms, p has a value of 0 or 1, m represents the number 2, 3 or 4, the average value of which is 2.0 to 2.7 and n has a value of 1 to 100, Y is an aminofunctional group of the formula

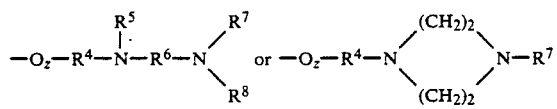

in which R$^4$, R$^5$, R$^6$, R$^7$, R$^8$ and z have the meaning already given, Z represents X, Y or R$^1$, a has a value of 10 to 150, b has a value of 1 to 20 and c has a value of 1 to 20.

13. The method of at least partially opening the cells of rigid polyurethane foam according to claim 12, in which the ratio of b:c in the polysiloxane polyoxyalkylene block copolymer is 0.9:0.1 to 0.2:0.8.

14. The method of at least partially opening the cells of rigid polyurethane foam according to claim 11 in which the polysiloxane polyoxyalkylene block copolymer has the average formula

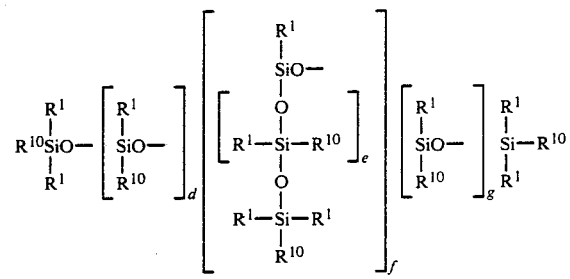

wherein

R$^1$ has the meaning already given,

R$^{10}$ is selected from the group comprising R$^1$, X and Y, which have the meaning already given, with the proviso that at least one X group and one Y group must be present in the average molecule d has a value of 0 to 20, e has a value of 0 to 20, f has a value of 1 to 10 and g has a value of 0 to 20.

15. The method of at least partially opening the cells of rigid polyurethane foam according to claim 14, in which d has a value of 1 to 10, e has a value of 1 to 10, f has a value of 1 to 6 and g has a value of 1 to 10.

16. The method of at least partially opening the cells of rigid polyurethane foam according to claim 12, in which R$^1$ is a methyl group.

17. The method of at least partially opening the cells of rigid polyurethane foam according to claim 12, wherein z in the aminofunctional group of the polysiloxane polyoxyalkylene block copolymer has value of 0 and R$^4$ is a group having the formula —(CH$_2$)$_3$—O—CH$_2$—CHOH—CH$_2$—.

18. The method of at least partially opening the cells of rigid polyurethane foam according to claim 12, in which in the polysiloxane polyoxyalkylene block copolymer R$^5$ is a hydrogen atom or a methyl group, R$^6$ is a —(CH$_2$)$_3$— group and R$^7$ and R$^8$ are each a methyl group.

19. The method of at least partially opening the cells of rigid polyurethane foam according to claim 12, in which the polysiloxane polyoxyalkylene block copolymer is added to the polyol.

20. The method of at least partially opening the cells of rigid polyurethane foam according to claim 12, in which the polyol and the diisocyanate are reacted to form prepolymer having isocyanate groups and the polysiloxane polyoxyalkylene block copolymer is added to the prepolymer.

21. The product obtained by the method of claim 1.

* * * * *